United States Patent
Waechter et al.

(10) Patent No.: US 9,468,147 B2
(45) Date of Patent: Oct. 18, 2016

(54) COMBINATION OF A TOWING VEHICLE AND A HARVESTING MACHINE DRAWN THEREBY THAT OPERATE IN A HARVESTING CONFIGURATION OR A FIELD-END CONFIGURATION DEPENDING UPON A SITUATION IN WHICH HARVESTING MACHINE IS IN

(71) Applicant: USINES CLAAS FRANCE S.A.S., Woippy (FR)

(72) Inventors: Julien Waechter, Failly (FR); Frederic Chesnier, Norry les Pont a Mousson (FR)

(73) Assignee: USINES CLAAS FRANCE S.A.S., Woippy (FR)

( * ) Notice: Subject to any disclaimer, the term of this patent is extended or adjusted under 35 U.S.C. 154(b) by 0 days.

(21) Appl. No.: 14/691,742

(22) Filed: Apr. 21, 2015

(65) Prior Publication Data
US 2015/0305241 A1 Oct. 29, 2015

(30) Foreign Application Priority Data
Apr. 25, 2014 (DE) .......................... 10 2014 105 820

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *A01D 69/00* | (2006.01) |
| *A01F 15/08* | (2006.01) |
| *G05B 15/02* | (2006.01) |

(52) U.S. Cl.
CPC ............... *A01D 69/00* (2013.01); *A01F 15/08* (2013.01); *G05B 15/02* (2013.01)

(58) Field of Classification Search
CPC .............. A01D 41/127; A01B 79/005; A01B 69/007; A01C 7/102; G05B 15/02; G05B 13/0275; G05D 2201/0201
USPC .......... 701/50, 2, 532, 93; 56/10.2 R; 460/1; 100/4
See application file for complete search history.

(56) References Cited

U.S. PATENT DOCUMENTS

| | | | | |
|---|---|---|---|---|
| 4,487,002 A | * | 12/1984 | Kruse ................ | A01D 41/1274 460/6 |
| 4,513,562 A | * | 4/1985 | Strubbe ................ | A01D 41/127 56/10.2 G |
| 4,704,866 A | * | 11/1987 | Myers ................... | F16H 61/435 180/306 |
| 4,930,411 A | * | 6/1990 | Naaktgeboren ..... | A01F 15/0825 100/191 |

(Continued)

FOREIGN PATENT DOCUMENTS

| | | |
|---|---|---|
| DE | 102005005556 | 8/2006 |
| EP | 0 903 656 | 3/1999 |
| EP | 2759194 | 7/2014 |

Primary Examiner — Árpád Fábián-Kovács
(74) Attorney, Agent, or Firm — Michael J. Striker

(57) ABSTRACT

A combination of a towing vehicle, such as a tractor, and an agricultural harvesting machine drawn thereby, such as a baler or a self-loading forage wagon, operates to detect whether the harvesting machine is in a harvesting situation ($S_1$) or in a field-end situation ($S_2$) by use of a control device. The control device is operated to specify at least one parameter setting for at least one functional device, by which the combination is operated in a harvesting configuration ($K_1$) or in a field-end configuration ($K_2$), depending on the situation ($S_1$, $S_2$) that is detected.

15 Claims, 3 Drawing Sheets

(56) References Cited

U.S. PATENT DOCUMENTS

| | | | |
|---|---|---|---|
| 5,551,218 A * | 9/1996 | Henderson | A01F 15/07 100/13 |
| 5,896,782 A * | 4/1999 | McIlwain | A01F 15/0841 56/10.2 A |
| 5,911,669 A * | 6/1999 | Stentz | A01D 41/1278 56/10.2 F |
| 5,995,895 A * | 11/1999 | Watt | A01B 79/005 56/10.2 G |
| 6,315,658 B1 * | 11/2001 | Weber | A01D 41/127 460/6 |
| 6,487,836 B1 * | 12/2002 | Coers | A01D 41/127 460/7 |
| 6,546,705 B2 * | 4/2003 | Scarlett | A01F 15/08 56/10.2 R |
| 6,681,551 B1 * | 1/2004 | Sheidler | A01B 63/1006 56/10.2 G |
| 7,370,575 B2 * | 5/2008 | Kraus | A01D 89/006 100/73 |
| 7,533,516 B2 * | 5/2009 | Pollklas | A01F 29/22 56/250 |
| 7,721,516 B2 * | 5/2010 | Wendling | A01D 41/12 460/22 |
| 9,072,223 B2 * | 7/2015 | Baumgarten | A01D 41/127 |
| 2001/0042362 A1 | 11/2001 | Scarlett et al. | |
| 2003/0110748 A1 * | 6/2003 | Coers | A01D 41/127 56/10.2 G |
| 2004/0006957 A1 | 1/2004 | David Sheidler et al. | |
| 2005/0210851 A1 * | 9/2005 | Covington | A01D 46/084 56/51 |
| 2006/0123757 A1 | 6/2006 | Baumgarten et al. | |
| 2010/0036569 A1 * | 2/2010 | Hel | A01B 61/025 701/50 |
| 2011/0238269 A1 * | 9/2011 | Martin | A01B 79/005 701/50 |
| 2012/0186504 A1 * | 7/2012 | Ryder | A01B 79/005 111/174 |
| 2012/0227647 A1 * | 9/2012 | Gelinske | G01F 1/666 111/174 |
| 2013/0116895 A1 * | 5/2013 | Smith | A01F 15/08 701/50 |
| 2013/0116896 A1 | 5/2013 | Blank | |
| 2013/0197767 A1 * | 8/2013 | Lenz | A01B 63/00 701/50 |
| 2013/0211628 A1 * | 8/2013 | Thurow | G06F 17/00 701/2 |
| 2014/0208708 A1 | 7/2014 | Waechter et al. | |
| 2014/0338298 A1 * | 11/2014 | Jung | A01D 41/127 56/10.2 R |
| 2014/0345481 A1 * | 11/2014 | Olander | A01F 15/0833 100/35 |
| 2014/0350752 A1 * | 11/2014 | Gelinske | A01C 7/081 701/2 |
| 2015/0264863 A1 * | 9/2015 | Muench | A01D 41/02 701/50 |
| 2015/0305241 A1 * | 10/2015 | Waechter | A01F 15/08 56/10.2 R |

* cited by examiner

COMBINATION OF A TOWING VEHICLE AND A HARVESTING MACHINE DRAWN THEREBY THAT OPERATE IN A HARVESTING CONFIGURATION OR A FIELD-END CONFIGURATION DEPENDING UPON A SITUATION IN WHICH HARVESTING MACHINE IS IN

CROSS-REFERENCE TO A RELATED APPLICATION

The invention described and claimed hereinbelow is also described in German Patent Application DE 10 2014 105 820.8, filed on Apr. 25, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to a combination of a towing vehicle, such as a tractor, and an agricultural harvesting machine, such as a baler or a self-loading forage wagon, drawn thereby.

Agricultural harvesting machines such as balers or self-loading forage wagons, which are drawn across the field by a towing vehicle, are often used in the harvesting of green crop. The aforementioned harvesting machines are typically supplied with drive power by the towing vehicle in order to drive available working assemblies of the harvesting machine (e.g., pick-up device, cutting device, feed rake, baling ram), which are used to convey and/or process the picked-up crop. The towing vehicle, which is usually a tractor, is equipped with a P.T.O. output shaft on the rear side for this purpose, wherein the P.T.O. output shaft is drivingly connected to a drive shaft assigned to the harvesting machine. The P.T.O. output shaft of the tractor is driven by the drive engine of the tractor. Therefore, the drive engine of the tractor, the P.T.O. output shaft and the drive shaft of the harvesting machine are essential elements of a drive train for driving the working assemblies of the harvesting machine.

When a block baling press drawn by a tractor is used for harvesting, it is difficult for the driver of the towing tractor to have a reliable overview of a large number of dynamically changing operating parameters, which play a role in the success of the harvesting process during the travel across the field. Factors such as the type, quantity, volume, moisture content or any other property of the picked-up crop, for example, greatly influence the harvesting process. Furthermore, machine-related factors affect the harvesting process, such as the power reserve and rotational speed of the drive engine of the tractor, the ground speed of the tractor (and the baler drawn thereby), the speed and load of individual working assemblies (e.g., pick-up device, cutting rotor, feed rake, baling ram) of the press, etc.

The factors have a complex interaction with one another, in part, and usually change dynamically during the harvesting operation. A particular challenge for a driver is therefore that of, inter alia, selecting a suitable ground speed during the harvesting operation. The selected ground speed must not be too high, in order to ensure that the combination of tractor and baler can be operated during the harvesting operation with a sufficient power reserve of the drive engine in order to prevent the drive train from coming to a standstill and/or to prevent damage to the machine or injury to persons in the event that harvesting and/or operating conditions change abruptly.

Due to the dimensions and shape of a field that is being worked, a tractor-baler combination is not always located in a harvesting situation of the type described above during field work, i.e., in an operating state in which the baler picks up crop in order to process this crop. For example, after travelling down a "run" (i.e., a driving path that is largely straight or slightly curved, in which an uninterrupted harvesting process can take place), the end of the field (also referred to as the headland) is reached, and therefore the tractor-baler combination must make a turning maneuver in order to continue harvesting along a subsequent run, which is usually laterally offset relative thereto. Harvesting is typically not carried out during travel in the headland.

In order to carry out the turning maneuver at the end of the field, the driver of the tractor must keep his or her eye on a plurality of parameters on the tractor and the baler in order to carry out various tasks simultaneously. For example, upon reaching the end of the field, an experienced driver simultaneously adjusts the ground speed, raises the pick-up device and steers the tractor around a curve. The driver also may lower the speed of the P.T.O. output shaft in order to save fuel. The driver carries out these tasks in reverse order upon leaving the end of the field, in order to start the harvesting process again.

From the field of tractors it is known, per se, with regard to tools that are mounted on the tractor, e.g., a plow, to reproduce, inter alia, the reciprocating motions thereof during a turning maneuver in accordance with previously stored working processes. Reference is made to EP 0 903 656 B1 in this regard. The number of operating procedures that the driver must be carry out repeatedly during a turning maneuver is therefore reduced, thereby helping to relieve the driver, since all that the driver needs to do is initiate the execution of the stored working processes.

The disadvantage of implementing this technology on a tractor-baler combination is that the time sequence in which the stored working processes are carried out is fixed. Time-dependent control is not always suitable when harvesting green crop, since, in this case, the spacing between adjacent runs (depending on the position of the particular swath) and, therefore, the driving routes in the headland, can vary to a great extent and therefore require different lengths of time to traverse.

SUMMARY OF THE INVENTION

The present invention overcomes the shortcomings of known arts, such as those mentioned above.

To that end, the present invention provides a combination of a combination of a towing vehicle such as a tractor and an agricultural harvesting machine drawn thereby, such as a baler or a self-loading forage wagon, which relieves the driver of monitoring and adjusting duties, which must be carried out on the combination when switching between travel for harvesting and travel at the end of the field.

The combination includes means for detecting whether the harvesting machine is in a harvesting situation or in a field-end situation and a control device operated to specify a parameter setting for at least one functional device of the combination, so the combination can be operated in a harvesting configuration or in a field-end configuration, depending on the situation that is detected.

In this case, the functional device can be any device of the towing vehicle and/or harvesting machine that is involved in the operation of the combination. A functional device of the towing vehicle can be, for example, the drive engine, ground speed regulator, P.T.O. output shaft or steering thereof, while the functional device of the harvesting machine can be, for example, the pick-up device, cutting device (rotor), feed rake, or baling ram thereof.

According to the invention, means are assigned to the combination, which are used to detect whether the harvesting machine is in a harvesting situation (i.e., a situation, in which crop can be picked up and harvested) or in a field-end situation (i.e., situation, in which the harvesting machine has exited a crop stand and, therefore, a driving maneuver must be carried out in order to guide the harvesting machine into another crop stand). Depending on the situation that is detected ("harvesting" or "field end"), the control device ensures that the combination is operated either in a "harvesting configuration" or a "field-end situation" in that the control device of the at least one functional device specifies a suitable parameter setting (or parameter settings).

Advantageously, the detection as to whether the harvesting machine is in a harvesting situation or in a field-end situation is carried out depending on one or more operating criteria of the combination. An operating criterion can be, in particular, any state of the combination that can be detected and/or manually set by a driver.

In an embodiment, the combination includes at least one sensor assembly assigned to the control device, by means of which at least one state of the combination, such as a steering angle of the towing vehicle, a position of the harvesting machine and/or the towing vehicle, a pick-up state of crop into the harvesting machine, is detected, wherein, on the basis of at least one of these states, the control device determines whether the harvesting machine is in the harvesting situation or in the field-end situation.

In order to suppress detection errors resulting from extremely brief, temporary state changes, the control device detects the applicable situation only if a corresponding state exists for a predefinable minimum period of time. This prevents a field-end situation (which would be erroneous in this case) from being detected on the basis of a brief interruption of the crop pick-up resulting from a gap in the swath.

A pick-up state of the harvesting machine is detected in that a load sensor, e.g., a torque detector in the drive train of a feed device, is assigned to a crop conveying and/or processing assembly. The load sensor is used to detect the pick-up state of crop into the harvesting machine.

Alternatively or in addition thereto, the harvesting machine, the towing vehicle or both include a crop detector, by which the presence of crop directly in front of the harvesting machine, the tractor or both is detected in order to derive information on an expected pick-up state of crop into the harvesting machine therefrom.

In principle, different measures are conceivable that are triggered in conjunction with the detection of either the "harvesting" or "field-end" situation by the control device. Advantageously, the control device carries out a parameter adjustment for one of the following variables: a ground speed of the combination, a steering angle of the towing vehicle, a transmission ratio of the ground drive of the towing vehicle, a speed of the P.T.O. output shaft of the towing vehicle, a transmission ratio of P.T.O. output shaft, a vertical position of the pick-up device, a drive state of the pick-up device, rotor, feed rake and/or baling ram of the harvesting machine.

In this context, the combination provides that the control device specifies a ground speed for the combination both during operation in the harvesting configuration and during operation in the field-end configuration. This meaure relieves the driver of the task of monitoring and controlling the ground speed of the combination at every point in time of field work, both during harvesting and in the headland, so he or she may concentrate on other important activities.

In an embodiment, the control device automatically initiates one or more measures upon detection of the field-end situation, wherein the include specifying a ground speed, raising the pick-up device, reducing the speed of the P.T.O. output shaft, stopping the drive of the crop conveying and/or processing assembly, and unlocking the steering axle of the harvesting machine, in order to bring the combination into the field-end configuration.

In this connection, during operation in the field-end configuration, the control device specifies a ground speed for the combination, which corresponds to a value that can be defined by an operator, or to a value, which is determined by the control device on the basis of the characteristics of the headland in each case. In the first case, the combination therefore automatically travels at the end of the field with a ground speed that is specified by the operator. In the second case, the control device independently determines/calculates a ground speed with consideration for the property (e.g.: shape, size, incline) of the headland on the basis of stored topographical data.

Advantageously, the control device automatically initiates one or more measures upon detection of the harvesting situation. The measures are in particular: specifying a ground speed, lowering the pick-up device, increasing the speed of the P.T.O. outputting shaft, starting the drive of the crop conveying and/or processing assembly, and locking the steering axle of the harvesting machine, in order to bring the combination into the harvesting configuration.

As mentioned above, a particular challenge is that of selecting a suitable ground speed during the harvesting travel of a tractor-baler combination. The reason for this is that the influential factors of the two machines and of the remaining harvesting conditions are in a complex interaction with one another, in part, and usually continuously change during the harvesting travel. The selected ground speed must not be too high, in order to ensure that the combination of tractor and baler is operated during the harvesting operation with a sufficient power reserve of the drive engine in order to prevent the drive train from coming to a standstill and/or to prevent damage to the machine or injury to persons in the event that harvesting and/or operating conditions change abruptly.

In practical application, this typically results in the driver selecting a ground speed for safety reasons that is lower than would be permitted by the actual conditions. The potential output of the combination cannot be fully utilized in this case. The driver must have a great deal of knowledge and experience in order to pursue further-reaching and/or alternative objectives during the harvesting operation. An unsuitable selection of the speed can also have further disadvantageous effects, such as a poorer quality of the pressed bales (poor bale shape, crushing the crop).

In an embodiment, the control device specifies a ground speed for the combination during operation in the harvesting configuration, which depends on continuously detected operating parameters of the harvesting machine and of the towing vehicle. This ensures that the ground speed is selected with on-going consideration of influential factors of the entire combination. Machine standstills or damage due to working assemblies being overloaded is therefore reliably prevented.

In addition, due to the towing vehicle and harvesting machine being considered as a whole, it is ensured that the combination continuously operates in a particularly efficient manner, for example, close to the limit of full capacity or the optimal quality thereof, even for less experienced drivers. The specification of speed during the harvesting travel provides clear relief for the driver. Advantageously, the ground speed specification is part of an automatic ground speed controller, which continuously and automatically regulates the specified ground speed of the towing vehicle. In this case, the driver is fully relieved of the task of selecting the ground speed during harvesting travel.

The ground speed can be selected during operation in the harvesting configuration such that the combination achieves at least one harvesting objective, specified by the machine operator, while ensuring safe operation. In other words, in specifying the ground speed, the control device then accounts for (at least) one harvesting objective, i.e., the control device attempts to select a ground speed at which a desired harvesting success can be achieved to the greatest possible extent, proceeding from the background of the current operating parameter at the moment. This can be a single harvesting objective, such as achieving a high throughput rate or achieving a high quality or density.

In order to control speed in the harvesting configuration, the operating parameters of the harvesting machine are based on at least one variable that characterizes the mechanical load of one or more working assemblies, such as the speed, torque, working pressure and/or the like thereof, and/or a variable related to the harvesting process, such as the moisture content of the crop, the crop volume, the bale density, the packet size, the throughput and/or the like. As an alternative or in addition thereto, the load of the drive engine of the towing vehicle and/or the current transmission ratio of the ground drive of the towing vehicle is taken into account as operating parameters of the towing vehicle. Other operating parameters such as, for example, the wheel slip, the remaining fuel reserve, etc., also are conceivable.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
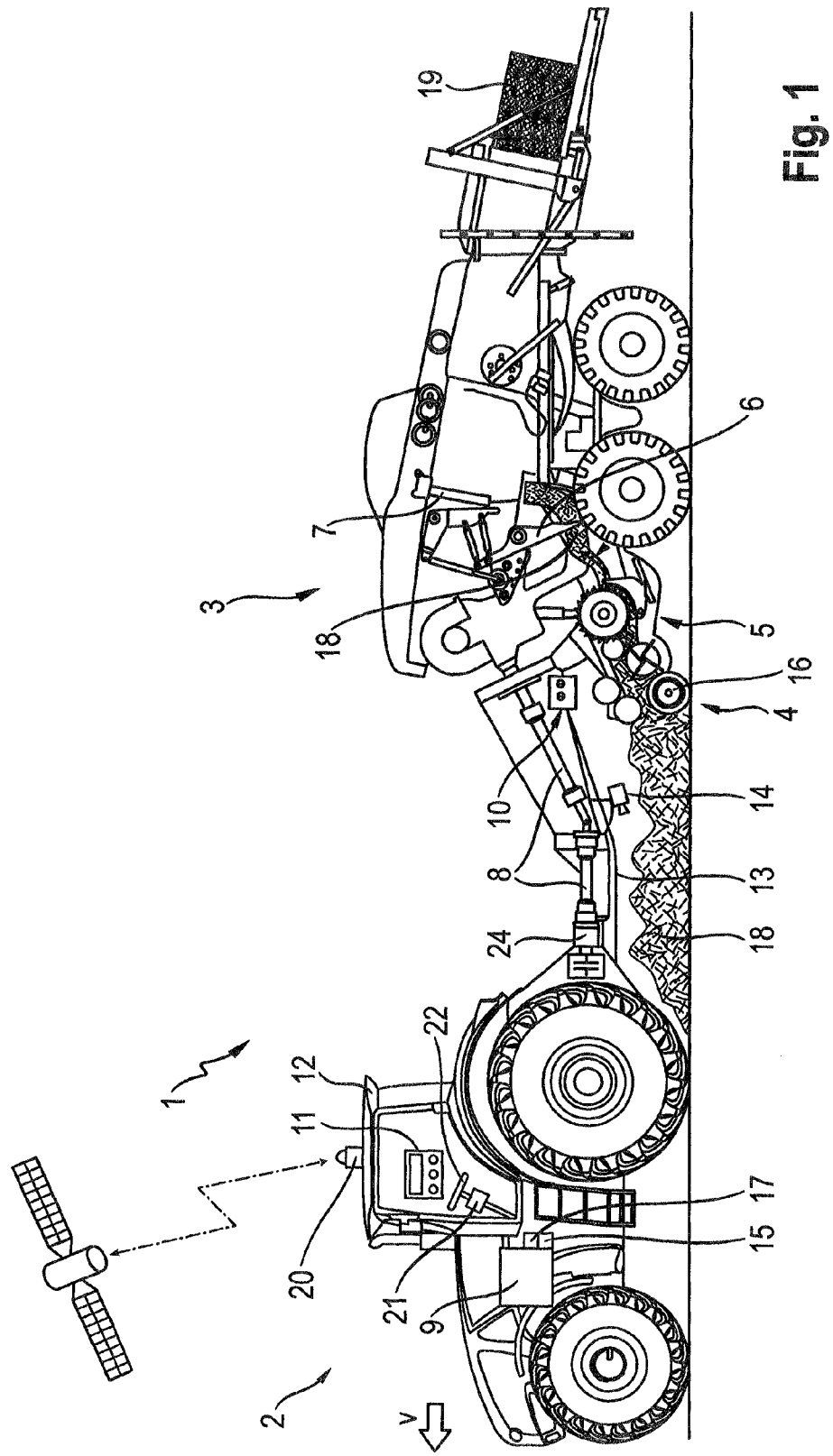
FIG. 1 depicts a schematic side view of a combination of a tractor and a baler.

FIG. 1 shows a schematic side view of a combination 1 according to the invention, which comprises a towing vehicle in the form of a tractor 2 and an agricultural harvesting machine drawn thereby in the form of a block baling press 3 during travel across the field. As an alternative to the baler 3, this could be a different type of drawn harvesting machine, which is equipped with a working assembly for conveying and/or processing crop 18, such as a self-loading forage harvester.

The baler 3 comprises various working assemblies 4, 5, 6, 7 for conveying and/or processing crop. A pick-up device 4 is located at the front, by which crop 18 laid down in the form of a swath is picked up from the field, is guided together laterally and is conveyed into the crop channel of the baler 3 for further processing. The crop 18 then passes through a cutting device 5 equipped with a cutting rotor and is then precompressed by a feed rake 6, which undergoes periodic gathering and filling strokes, in order to be fed in portions (by a filling stroke of the feed rake 6 in each case) to a bale chamber, in which a baling ram 7, which can move back and forth, presses the crop 18 into bales 19. Finished bales 19 exit the baler 3 at the rear.

The working assemblies 4, 5, 6, 7 of the baler 3 are provided with drive power via a drive shaft 8 (here: angled universal drive shaft) of the tractor 2. The drive shaft is connected to the P.T.O. output shaft 24 at the rear of the tractor 2. To this end, the tractor 2 comprises a drive engine 9, which can be brought into a drive connection with the P.T.O. output shaft 24, and therefore the drive engine 9 of the tractor 2, the P.T.O. output shaft 24 and the drive shaft 8 form a drive train for the baler 3. Gearboxes, which are not explained here in greater detail, are used to distribute the power transferred to the baler 3 to the individual working assemblies thereof.

The drive engine 9 of the tractor 2 also is part of a drive train of the ground drive of the tractor 2 in a manner known per se, that is, this drive engine is used to drive the wheels of the tractor 2. Depending on the engine speed of the drive engine 9 and on a selected transmission ratio, the tractor 2 tows the baler 3 across the field at a ground speed v indicated by an arrow, said ground speed being set by a ground speed regulator 17.

A control device 10 is assigned to the baler 3 and is connected to the tractor 2 for data exchange via a data bus system 13, preferably ISOBUS. To this end, a user interface 11, which is easily accessible by a driver, is disposed in the driver's cab 12 of the tractor 2 in particular, wherein this user interface communicates with the control device 10 via the data bus system 13. The user interface 11 comprises control elements and a display, for depicting operating parameters. Furthermore, the control device 10 is connected to the ground speed regulator 17 of the tractor 2 via the data bus system 13 and can thereby influence this ground speed regulator. The ground speed regulator 17 influences the ground speed v by controlling the drive engine 9 and a (non-illustrated) transmission. The control device 10 of the harvesting machine 3 can specify a ground speed v to the tractor 2 by means of the signal connection between the control device 10 and the ground speed regulator 17.

In addition, a load sensor 15 is assigned to the drive engine 9 of the tractor 2. This load sensor is used to detect the current load state (e.g., a torque that is present) of the drive engine 9. The tractor 2 also comprises a steering device having a steering wheel 22, which is disposed in the driver's cab. A steering angle $z_3$, which is determined via the steering wheel 22, is detected by a steering angle sensor 21. In addition, a satellite-based position sensor 20 is disposed on the roof of the driver's cab 12. This position sensor is used to calculate the position $z_2$ of the tractor 2, and/or also that of the baler 3 by accounting for a displacement (provided the spacing between the tractor 2 and the baler 3, as well as the direction of travel, are known) relative to the tractor 2.

As explained above, the baler 3 comprises various conveying assemblies and/or working assemblies. In order to detect whether the baler 3 is picking up crop 18, the baler is equipped with two different detection systems. According to a first system, a load sensor 16 is assigned to a driven working unit (pick-up drum) of the pick-up device 4. On the basis of the load signal $z_3$ (e.g., torque detection) of the load sensor 16, it is possible to deduce whether (and to what extent, if applicable) the baler 3 is currently picking up crop 18 or not. A comparable sensor also could be disposed on another unit of the baler 3 that conveys crop 18 in order to detect the crop pick-up state. According to a second system, a camera 14 is assigned to the baler 3. This camera 14 is disposed underneath a tow bar of the baler 3 and is oriented such that a region located directly in front of the pick-up 4 is optically detected. By evaluating the image captured by the camera 14, it is deduced whether (and to what extent, if applicable) the baler 3 is currently picking up crop 18 or not.

The interaction and effects of the combination 1, which can be achieved according to the invention, are explained in the following with reference to FIG. 2.

Figure 2:
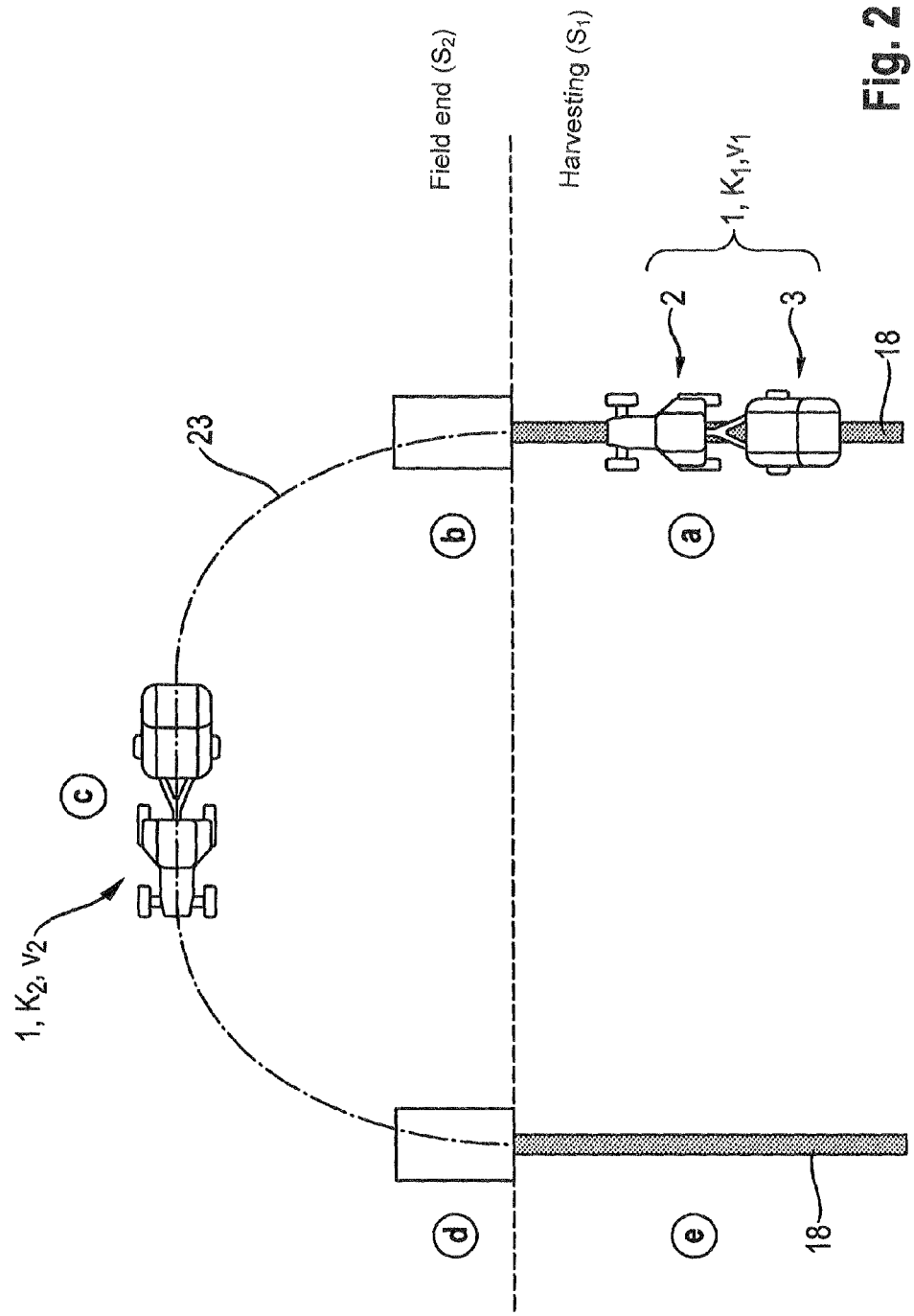
FIG. 2 depicts a schematic top view of a combination of a tractor and a baler in various situations of field work.

FIG. 2 shows a schematic top view of a combination 1 of a tractor 2 and a baler 3, which is drawn by the said tractor, in various situations of field work. The combination 1 according to FIG. 2 is equivalent to the combination 1 shown in FIG. 1 and is explained with reference thereto. As shown, the combination 1 drives along a driving path 23 and thereby reaches five successive path points a, b, c, d, e. The driving path 23 has the shape of an (inverted) U and is cut by a dashed auxiliary line. A region underneath the dashed auxiliary line corresponds to an area of a field that is intended to be worked by the combination 1 and on which crop 18 is placed in swaths, which extend parallel to one another. The objective of the harvesting process is to pick up the thusly deposited crop 18 with the baler 3 and press the crop into bales 19 (FIG. 1).

A region above the dashed auxiliary line (as shown in FIG. 2) is the so-called field end (or "headland") of the field. In this region of the field, there is no crop present, or the crop has already been harvested. The headland is significant for the combination 1 in that this is where there is sufficient space for turning the combination 1, after harvesting travel along a first swath (past path point a), by traveling around a curve, in order to subsequently continue harvesting travel along another swath (along path point e).

Whereas the first path point a and the last path point e of the driving path 23 shown in FIG. 2 are located in the region of a field area to be harvested (harvesting situation $S_1$), the path points b to d are located in the region of the field end (field-end situation $S_2$).

When switching between the harvesting situation $S_1$ and the field-end situation $S_2$, it is typically necessary to adjust a plurality of parameters on the tractor and the baler. In order to carry out the turning maneuver at the end of the field, which is shown in FIG. 2, the driver of the tractor 2 must keep his or her eye on a plurality of parameters on the tractor 2 and the baler 3 in order to carry out various tasks simultaneously. For example, upon reaching the end of the field, an experienced driver simultaneously adjusts the ground speed, raises the pick-up device and steers the tractor around a curve. He may also lower the speed of the P.T.O. output shaft in order to save fuel. The driver carries out these tasks in reverse order upon leaving the end of the field, in order to start the harvesting process again. All this requires a great deal of attentiveness, skill, and experience.

In order to relieve the driver and in order to improve the coordination of the machinery, the combination includes means 14, 16, 20, 21 for detecting whether the harvesting machine 3 is in a harvesting situation $S_1$ or in a field-end situation $S_2$, and by control device 10, which is operated to specify at least one parameter setting for at least one functional device 4, 5, 6, 7, 9, 17, 24 of the combination 1. Consequently, the combination 1 is operated in a harvesting configuration $K_1$ or in a field-end configuration $K_2$, depending on the situation $S_1$, $S_2$ that is detected.

In the combination 1 shown in FIGS. 1 and 2, the detection of the harvesting situation $S_1$ or the field-end situation $S_2$ takes place as explained in the following with reference to FIG. 3.

Figure 3:
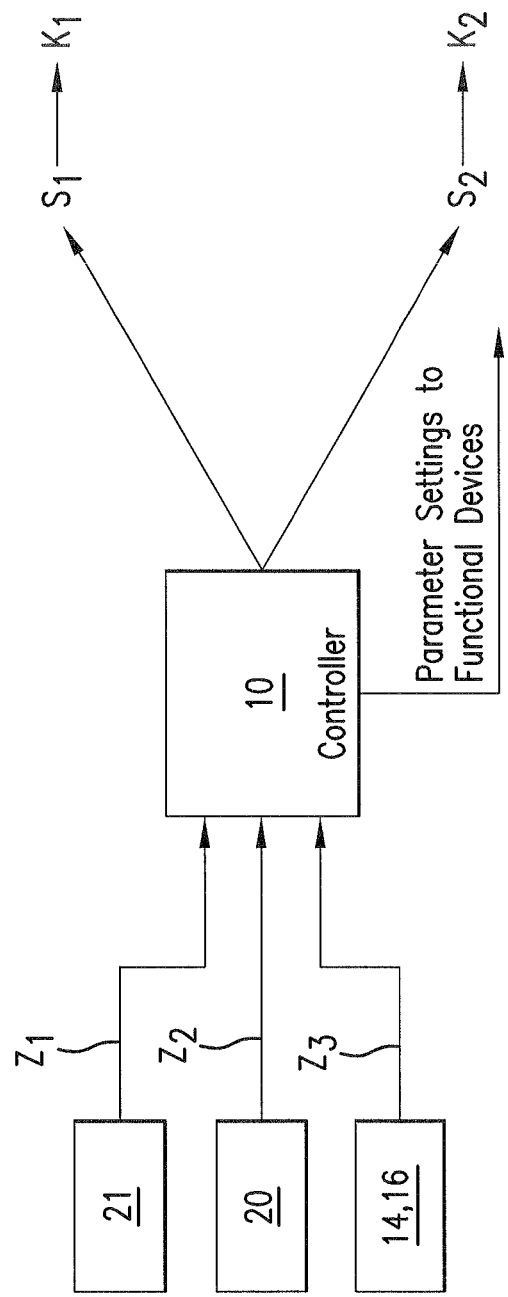
FIG. 3 depicts a functional diagram of the control.

That is, FIG. 3 shows a functional diagram of a control device 10 that is used on the combination 1. The control device 10 has three parallel signal inputs in this case. A first input relates to the steering angle sensor 21, which detects a steering angle $z_1$ of the tractor 2 and transmits the corresponding signal input to the control device 10. A second input relates to the position sensor 20, which detects the position $z_2$ of the tractor 2 and transmits corresponding signal input to the control device 10. A third input relates to a sensor assembly for determining the crop pick-up state. This comprises two types of sensors: the camera 14 and the load sensor 16 disposed on the pick-up device 4. The sensors detect the crop pick-up state $z_3$ of the harvesting machine 3 and transmit corresponding signal input(s) to the control device 10. The control device 10 therefore receives at least three input signals $z_1$, $z_2$, $z_3$ regarding the state of the combination 1 (other signal inputs are conceivable).

On the basis of at least one of these states, the control device 10 deduces whether the harvesting machine 3 is in the harvesting situation $S_1$ or in the field-end situation $S_2$. For example, the presence of the field-end situation $S_2$ can be detected in that a certain steering angle $z_1$ is exceeded for a certain minimum period of time or in that no crop 18 has been picked up for a certain minimum period of time (crop pick-up state $z_3$). As an alternative or in addition thereto, the field-end situation $S_2$ can be detected on the basis of the position $z_2$ that the tractor 2 has reached the field end situation $S_2$.

Conversely, the presence of the harvesting situation $S_1$ can be detected in that a certain steering angle $z_1$ is no longer exceeded for a certain minimum period of time or in that crop 18 has been picked up again for a certain minimum period of time (crop pick-up state $z_3$). As an alternative or in addition thereto, the harvesting situation $S_1$ can be detected on the basis of the position $z_2$ that the tractor 2 is exiting the field end $S_2$ and can start harvesting again ($S_1$). It is conceivable, of course, that the combination 1 is equipped with only one or two of the aforementioned detection systems. As an alternative, another detection system that serves the desired purpose also can be used.

As soon as the control device 10 has detected a switch into another situation $S_1$, $S_2$ (FIG. 3), the control device 10 initiates a switch into a suitable configuration $K_1$ or $K_2$. This takes place in that the control device 10 of the combination 1 specifies one or, in particular, a plurality of parameter settings, which relate to one of the following variables: a ground speed $v_1$ or $v_2$ of the combination 1, a steering angle $z_1$ of the towing vehicle 2, a transmission ratio of the ground drive of the towing vehicle 2, a speed to the P.T.O. output shaft 24 of the towing vehicle 2, a transmission ratio of the P.T.O. output shaft 24, a vertical position of the pick-up device 4, and a drive state of the pick-up device 4, rotor 5, feed rake 6 and/or baling ram 7 of the harvesting machine 3. In the end, this results in the combination being operated in a configuration $K_1$ during harvesting $S_1$ and in a configuration $K_2$ at the field end $S_2$. In this connection, it is advantageous to the driver that the switch between these configurations $K_1$, $K_2$ takes place automatically. The driver is therefore relieved of the task of performing a plurality of adjustment tasks. In addition, the switch between the configurations $K_1$, $K_2$ takes place in an event-controlled manner, i.e., not according to a fixed time sequence, if a changed harvesting situation $S_1$, $S_2$ is actually detected.

As mentioned above, different parameter settings are conceivable, which are taken into consideration when switching between the configurations $K_1$, $K_2$. According to a particularly expedient application of the invention, the control device 10 specifies a ground speed $v_1$, $v_2$ for the combination 1 during the operation in the harvesting configuration $K_1$ and during the operation in the field-end configuration $K_2$. The driver is therefore fully relieved of the duties to monitor and adjust the ground speed.

According to an embodiment, the control device 10 automatically initiates one or more measures upon detection of the field-end situation $S_2$. The measures can be, in particular: specify the ground speed $v_2$, raising the pick-up device 4, reducing the speed of the P.T.O. output shaft 24, stopping the drive of the crop conveying and/or processing assembly 4, 5, 6, 7, unlocking the steering axle of the harvesting machine 3, in order to bring the combination 1 into the field-end configuration $K_2$.

In particular, as indicated in FIG. 2, the invention provides that, during operation in the field-end configuration $K_2$, the control device 10 specifies a ground speed $v_2$ for the combination 1, which corresponds to a value that can be defined by an operator, or to a value, which is determined by the control device 10 on the basis of the characteristics of the headland in each case.

Upon detection of the harvesting situation $S_1$, the invention provides that the control device 10 automatically initiates one or more measures. The measures can be, in particular: specifying a ground speed $v_1$, lowering the pick-up device 4, increasing the speed of the P.T.O. output shaft 24, starting the drive of the crop conveying and/or processing assembly 4, 5, 6, 7, and locking the steering axle of the harvesting machine 3, in order to bring the combination 1 into the harvesting configuration $K_1$.

According to an embodiment, the control device 10 specifies a ground speed $v_1$ for the combination 1 during operation in the harvesting configuration $K_1$, which depends on continuously detected operating parameters of the harvesting machine 3 and the towing vehicle 2.

In other words, in the harvesting configuration $K_1$, the speed is specified (indicated by "$v_1$") on the basis of continuously detected operating parameters of the tractor 2 and of the baler 3 and is continuously adapted to the particular harvesting and machine conditions. To this end, additional signal inputs can be assigned to the control device 10, wherein at least the signals coming from the tractor 2 are fed to the control device 10 via a data bus 13. As a result, there is no need for cable connections between the tractor 2 and the baler 3 in addition to the bus cable.

The tractor 2 is equipped with a load sensor 15 of the drive engine 9, for example. The current engine load detected in this manner is transmitted to the control device 10 via the data bus 13. Advantageously, the current ground speed and/or the current transmission ratio of the ground drive of the tractor 2 or any other engine/transmission operating data can be transmitted to the control device 10. It is easily conceivable that the control device 10 receives further operating parameters of the tractor 2 via the data bus 13 that play a role in the specification of a ground speed $v_1$. The baler 3 is advantageously equipped with a plurality of sensors, which detect different operating parameters of the baler 3. These are sensors (such as the load sensor 16), for detecting the load state of individual working assemblies such as the pick-up device 4, the cutting device 5, the feed rake 6, the baling ram 7.

By detecting the speed, the drive torque or the working pressure of individual machine components (pick-up drum, cutting rotor, feed rake crank), the sensors directly or indirectly detect the load of associated working assemblies. Since the control device 10 continuously receives the values of the detected operating parameters, this control device can then specify a ground speed $v_1$ depending on the harvesting conditions and the performance capacity of the tractor 2 and the baler 3.

The described combination 1 has various advantageous effects. First, the driver's comfort is increased, since the driver is relieved of the duty to simultaneously monitor and adapt a plurality of parameter settings. In addition, due to the automatic parameter adjustment, the operating time in the headland is reduced, thereby increasing the overall utilization of the machinery. Furthermore, implementing the proposed measures in the headland, such as reducing the P.T.O. shaft speed and temporarily halting of the working assemblies (feed rake, rotor, pick-up device), reduces fuel consumption.

LIST OF REFERENCE SIGNS 1 combination
2 tractor
3 baler
4 pick-up device
5 cutting device
6 feed rake
7 baling ram
8 drive shaft
9 drive engine
10 control device
11 user interface
12 driver's cab
13 data bus system
14 camera
15 load sensor
16 load sensor
17 ground speed regulator
18 crop
19 pressed bales
20 position sensor
21 steering angle sensor
22 steering wheel
22 driving path
23 P.T.O. output shaft
24 $S_1$ harvesting situation
$S_2$ field-end situation
v ground speed
$z_1$ steering angle
$z_2$ position signal
$z_3$ crop pick-up state
a-e path points As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combination of a towing vehicle and an agricultural harvesting machine, comprising:
    at least one functional device;
    means for detecting whether the harvesting machine is in a harvesting situation ($S_1$) or in a field-end situation ($S_2$),
    wherein the means for detecting includes: a control device, which is connected to each said at least one functional device, and a sensor assembly;
    wherein the control device is configured to specify at least one parameter setting for each said at least one functional device, to control each said at least one functional device and, therefore, the combination in a harvesting configuration ($K_1$) or in a field-end configuration ($K_2$), depending on the harvesting situation ($S_1$) that is detected, the field-end situation ($S_2$) that is detected or both; and
    wherein the sensor assembly is configured to detect at least one of a state ($z_1$) defined by a steering angle of the towing vehicle, a state ($z_2$) defined by a position of the harvesting machine, the towing vehicle or both or a state ($z_3$) defined as a pick-up state of crop into the harvesting machine;
    wherein on the basis of the at least one of the states ($z_1$, $z_2$, $z_3$), the control device determines whether the harvesting machine is in the harvesting situation ($S_1$) or in the field-end situation ($S_2$).

2. The combination according to claim 1, wherein the detection as to whether the harvesting machine is in a harvesting situation ($S_1$) or in a field-end situation ($S_2$) is carried out depending on one or more operating criteria of the combination.

3. The combination according to claim 1, wherein the control device detects the applicable situation ($S_1$, $S_2$) only if a corresponding state exists for a predefinable minimum period of time.

4. The combination according to claim 1, wherein a load sensor is assigned to a crop conveying or processing assembly of the harvesting machine to detect the pick-up state ($z_3$) of crop into the harvesting machine.

5. The combination according to claim 1, wherein the harvesting machine or the towing vehicle comprises a crop detector by which a presence of crop directly in front of the harvesting machine or the tractor or both is detected in order to derive information on an expected pick-up state ($z_3$) of crop into the harvesting machine.

6. The combination according to claim 1, wherein the control device carries out an adjustment of one of the following variables: a ground speed (v) of the combination, a steering angle ($z_1$) of the towing vehicle, a transmission ratio of the ground drive of the towing vehicle, a speed of the P.T.O. output shaft of the towing vehicle, a transmission ratio of P.T.O. output shaft, a vertical position of the pick-up device, and a drive state of the pick-up device, rotor, feed rake or baling ram of the harvesting machine.

7. The combination according to claim 1, wherein the control device specifies a ground speed ($v_1$, $v_2$) for the combination during the operation in the harvesting configuration ($K_1$) and during the operation in the field-end configuration ($K_2$).

8. The combination according to claim 1, wherein the control device automatically initiates one or more measures upon detection of the field-end situation ($S_2$) selected from the group consisting of: specifying the ground speed ($v_2$), raising the pick-up device, reducing the speed of the P.T.O. output shaft, stopping the drive of the crop conveying or processing assembly and unlocking the steering axle of the harvesting machine in order to bring the combination into the field-end configuration ($K_2$).

9. The combination according to claim 1, wherein during operation in the field-end configuration ($K_2$), the control device specifies a ground speed ($v_2$) for the combination that corresponds to a value that can be defined by an operator or determined by the control device on the basis of characteristics of a headland in each case.

10. The combination according to claim 1, wherein the control device automatically initiates one or more measures upon detection of the harvesting situation ($S_1$), the measures including: specifying the ground speed ($v_1$), lowering the pick-up device, increasing the speed of the P.T.O. output shaft, starting the drive of the crop conveying or processing assembly and locking the steering axle of the harvesting machine, in order to bring the combination into the harvesting configuration ($K_1$).

11. The combination according to claim 1, wherein the control device specifies a ground speed ($v_1$) for the combination during operation in the harvesting configuration ($K_1$), which depends on continuously detected operating parameters of the harvesting machine and the towing vehicle.

12. The combination according to claim 11, wherein the ground speed ($v_1$) is selected such that the combination achieves at least one harvesting objective that is specified by the machine operator while ensuring safe operation.

13. The combination according to claim 11, wherein the operating parameters of the harvesting machine are based on at least one variable that characterizes the mechanical load of one or more working assemblies including speed, torque or working pressure, at least one a variable related to the harvesting process including a moisture content of the crop, a crop volume, a bale density, a packet size and a throughput, or both.

14. The combination according to claim 11, wherein the load of the drive engine of the towing vehicle, the current transmission ratio of the ground drive of the towing vehicle or both are taken into account as the operating parameter of the towing vehicle.

15. The combination according to any one of the claim 11, wherein the towing vehicle is a tractor and wherein the agricultural harvesting machine drawn thereby is a baler or a self-loading forage wagon.

* * * * *